US009317109B2

(12) United States Patent
Davis et al.

(10) Patent No.: US 9,317,109 B2
(45) Date of Patent: Apr. 19, 2016

(54) INTERACTIVE IMAGE PROJECTION ACCESSORY

(71) Applicant: MEP Tech, Inc., Salt Lake City, UT (US)

(72) Inventors: Mark L. Davis, West Jordan, UT (US); Matthew Lund Stoker, Bountiful, UT (US); William Lorenzo Swank, Sunset, UT (US); Donald Roy Mealing, Park City, UT (US); Roger H. Hoole, Salt Lake City, UT (US); Jeffrey F. Taylor, Naperville, IL (US)

(73) Assignee: MEP Tech, Inc., Salt Lake City, UT (US)

( * ) Notice: Subject to any disclaimer, the term of this patent is extended or adjusted under 35 U.S.C. 154(b) by 0 days.

(21) Appl. No.: 13/842,291

(22) Filed: Mar. 15, 2013

(65) Prior Publication Data

US 2014/0015847 A1 Jan. 16, 2014

Related U.S. Application Data

(63) Continuation-in-part of application No. 13/547,626, filed on Jul. 12, 2012, now Pat. No. 8,808,089.

(51) Int. Cl.
*G06F 1/03* (2006.01)
*G06F 3/01* (2006.01)
(Continued)

(52) U.S. Cl.
CPC . *G06F 3/01* (2013.01); *A63F 13/10* (2013.01); *G09G 5/02* (2013.01);
(Continued)

(58) Field of Classification Search
CPC ... G06F 3/01; A63F 13/10; A63F 2300/1087; A63F 2300/66; A63F 2300/6045; A63F 2300/69; A63F 2009/2463; G09G 5/02
USPC .......................................................... 463/34
See application file for complete search history.

(56) References Cited

U.S. PATENT DOCUMENTS 5,844,985 A 12/1998 Kulberg et al.
5,853,327 A 12/1998 Gilboa
(Continued)

FOREIGN PATENT DOCUMENTS

| | | | |
|---|---|---|---|
| EP | 1827630 | B1 | 5/2008 |
| WO | 2007/107874 | A1 | 9/2007 |
| WO | 2009/149112 | A2 | 12/2009 |

OTHER PUBLICATIONS

Mike Hanlon, "Philips Entertaible—Electronic Multi-Touch Tabletop Gaming Platform," gizmag, Sep. 3, 2006, accessible online at http://www.gizmag.com/go/6093/, 7 pages.
(Continued)

*Primary Examiner* — John P Dulka
(74) *Attorney, Agent, or Firm* — Durham Jones & Pinegar, P.C., Intellectual Property Law Group

(57) ABSTRACT

An accessory facilitating interaction with a projected image at least partially sourced by the image generation device. The accessory receives an input image from a device, and projects at least a derived image of the input image onto a surface on which the accessory sits. For instance, the accessory might project the input image itself, or perhaps some post-processed version of the input image. A camera system captures data representing user interaction with the projected image. Based on this data, an image input event is detected, and then communicated to the device. For instance, if the image generation device were a touch-sensitive device, the device may respond to the user contacting the projected image the same as it would if the user touched the image generation device at the same corresponding location. Embodiments described herein also relate color compensation of a displayed image.

20 Claims, 11 Drawing Sheets

403 411 300B 408 404 410 412 405 406 409 407 300A 200A 401B 402B 200B 401A 402A

(51) Int. Cl.
*G09G 5/02* (2006.01)
*A63F 13/40* (2014.01)
*A63F 9/24* (2006.01)

(52) U.S. Cl.
CPC *A63F 2009/2463* (2013.01); *A63F 2300/1087* (2013.01); *A63F 2300/6045* (2013.01); *A63F 2300/66* (2013.01); *A63F 2300/69* (2013.01)

(56) References Cited

U.S. PATENT DOCUMENTS

| | | | | |
|---|---|---|---|---|
| 6,281,878 | B1 * | 8/2001 | Montellese | 345/156 |
| 6,331,145 | B1 | 12/2001 | Sity et al. | |
| 6,611,252 | B1 * | 8/2003 | DuFaux | 345/168 |
| 6,614,422 | B1 * | 9/2003 | Rafii et al. | 345/168 |
| 6,650,318 | B1 * | 11/2003 | Arnon | 345/168 |
| 6,710,770 | B2 * | 3/2004 | Tomasi et al. | 345/168 |
| 6,750,849 | B2 * | 6/2004 | Potkonen | 345/168 |
| 6,798,401 | B2 * | 9/2004 | DuFaux | 345/168 |
| 6,832,954 | B2 | 12/2004 | Odake et al. | |
| 6,955,297 | B2 * | 10/2005 | Grant | 235/462.08 |
| 7,095,033 | B2 | 8/2006 | Sorge | |
| 7,204,428 | B2 | 4/2007 | Wilson | |
| 7,753,798 | B2 | 7/2010 | Soltys et al. | |
| 8,485,907 | B2 | 7/2013 | Soltys et al. | |
| 2004/0065315 | A1 * | 4/2004 | Fish et al. | 126/263.08 |
| 2004/0102247 | A1 | 5/2004 | Smoot et al. | |
| 2004/0160000 | A1 | 8/2004 | Lindsey et al. | |
| 2005/0245302 | A1 | 11/2005 | Bathiche et al. | |
| 2006/0052885 | A1 | 3/2006 | Kong | |
| 2006/0073869 | A1 | 4/2006 | LeMay et al. | |
| 2006/0073892 | A1 | 4/2006 | Watanabe et al. | |
| 2007/0046625 | A1 | 3/2007 | Yee | |
| 2007/0178955 | A1 | 8/2007 | Mills | |
| 2007/0201863 | A1 * | 8/2007 | Wilson | G03B 29/00 396/429 |
| 2008/0032808 | A1 | 2/2008 | Ochi | |
| 2008/0122805 | A1 | 5/2008 | Smith et al. | |
| 2008/0278894 | A1 * | 11/2008 | Chen et al. | 361/681 |
| 2008/0280682 | A1 | 11/2008 | Brunner et al. | |
| 2008/0318550 | A1 | 12/2008 | DeAtley | |
| 2009/0020947 | A1 | 1/2009 | Albers | |
| 2009/0029754 | A1 | 1/2009 | Slocum et al. | |
| 2009/0104976 | A1 | 4/2009 | Ouwerkerk et al. | |
| 2009/0124382 | A1 | 5/2009 | Lachance et al. | |
| 2009/0264196 | A1 | 10/2009 | Fujimoto | |
| 2009/0323029 | A1 | 12/2009 | Chen et al. | |
| 2010/0020026 | A1 | 1/2010 | Benko et al. | |
| 2010/0035684 | A1 | 2/2010 | Kotlarik et al. | |
| 2010/0113148 | A1 | 5/2010 | Haltovsky et al. | |
| 2010/0182402 | A1 | 7/2010 | Nakajima et al. | |
| 2010/0241976 | A1 | 9/2010 | Nozaki et al. | |
| 2010/0279768 | A1 | 11/2010 | Huang et al. | |
| 2010/0285881 | A1 | 11/2010 | Bilow | |
| 2011/0007140 | A1 | 1/2011 | Nakahata et al. | |
| 2011/0133934 | A1 | 6/2011 | Tan et al. | |
| 2011/0165923 | A1 | 7/2011 | Davis et al. | |
| 2011/0256927 | A1 | 10/2011 | Davis et al. | |
| 2012/0223885 | A1 | 9/2012 | Perez | |
| 2013/0113975 | A1 * | 5/2013 | Gabris | 348/333.1 |

OTHER PUBLICATIONS

European Patent Office As International Searching Authority, "International Search Report and Written Opinion," mailed Jun. 7, 2011, in related PCT application No. PCT/US2011/020058, 16 pages.

* cited by examiner

INTERACTIVE IMAGE PROJECTION ACCESSORY

CROSS REFERENCE TO RELATED APPLICATIONS

This application is a continuation-in-part of commonly assigned, co-pending application Ser. No. 13/547,626, filed Jul. 12, 2012, entitled Projection of Interactive Game Environment, which application is incorporated herein by reference in its entirety.

BACKGROUND

There are a variety of conventional displays that offer an interactive experience supported by a computing system. Computer displays, for example, display images, which often have visualizations of controls embedded within the image. The user may provide user input by interacting with these controls using a keyboard, mouse, controller, or another input device. The computing system receives that input, and in some cases affects the state of the computing system, and further in some cases, affects what is displayed.

In some cases, the computer display itself acts as an input device using touch or proximity sensing on the display. Such will be referred to herein as "touch" displays. There are even now touch displays that can receive user input from multiple touches simultaneously. When the user touches the display, that event is fed to the computing system, which processes the event, and makes any appropriate change in computing system state and potentially the displayed state. Such displays have become popular as they give the user intuitive control over the computing system at literally the touch of the finger.

For instance, touch displays are often mechanically incorporated into mobile devices such as a tablet device or smartphone, which essentially operate as a miniature computing system. That way, the footprint dedicated for input on the mobile device may be smaller, and even perhaps absent altogether, while still allowing the user to provide input. As such, mobile devices are preferably small and the display area is often also quite small.

BRIEF SUMMARY

Embodiments described herein relate to an image generation device accessory facilitating interaction with a projected image sourced by the image generation device. The accessory receives an input image from an image generation device. For instance, the image generation device might be a smartphone, tablet, or any other device or system capable of generating an input image. The accessory projects at least a derived version of the input image onto a surface, perhaps a substantially flat surface such as a table surface on which the accessory sits. For instance, accessory might project the input image itself or a post-processed version of the input image.

A camera system captures data representing user interaction with a control visualization included in the projected image. Based on this data, an image input event is detected. For instance, a touch event might be detected, reflecting the user touching a portion of the image projected on the surface. The detected input event is then communicated to the image generation device. For instance, if the image generation device were a touch-sensitive device, the device may respond to the user contacting the projected image the same as the image generation device would if the user touched the image generation device at the same corresponding location.

Embodiments described herein also relate color compensation of a displayed image. The displayed image might be the projected image projected by the accessory, but the application of the color compensation may extend to any image generation to which color compensation might be advantageous. A camera system captures an image of a dynamic image (such as a movie, program, or game) and compares that capture image to the digital image representation used to generate the displayed image. If there is a difference in colorization, then a color compensation adjustment may be made to the digital image representation that would cause the displayed image to have greater color fidelity.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 11 illustrates an embodiment in which the elevated portion of an accessory of FIGS. 2 through 4 is angled downwards so as to project the image on the same surface that the accessory sits on.

DETAILED DESCRIPTION

The principles described herein relate to an image generation device accessory facilitating interaction with a projected image sourced by the image generation device. The accessory receives an input image from an image generation device. For instance, the image generation device might be a smartphone, tablet, or any other device or system capable of generating an input image. The accessory projects at least a derived image of the input image onto a surface, such as a surface on which the accessory sits. For instance, the accessory might project the input image itself, or perhaps some post-processed version of the input image.

A camera system captures data representing user interaction with the projected image. Based on this data, an image input event is detected. For instance, a touch event might be detected, reflecting the user touching a portion of the image projected on the surface. A user gesture (such as a hand or finger movement) might also be detected as a possible input event. The detected input event is then communicated to the image generation device. For instance, in the case of a touch event, if the image generation device were a touch-sensitive device, the device may respond to the user contacting the projected image the same as the image generation device would if the user touched the image generation device at the same corresponding location.

Embodiments described herein also relate to color compensation of a displayed image. The displayed image might be the projected image projected by the accessory, but the application of the color compensation may extend to any image generation to which color compensation might be advantageous. A camera system captures an image of a dynamic image (such as a movie, program, or game) and compares that captured image to the digital image representation used to generate the displayed image. If there is a difference, then a color compensation adjustment may be made to the digital image representation that would cause the displayed image to have greater color fidelity.

Figure 1:
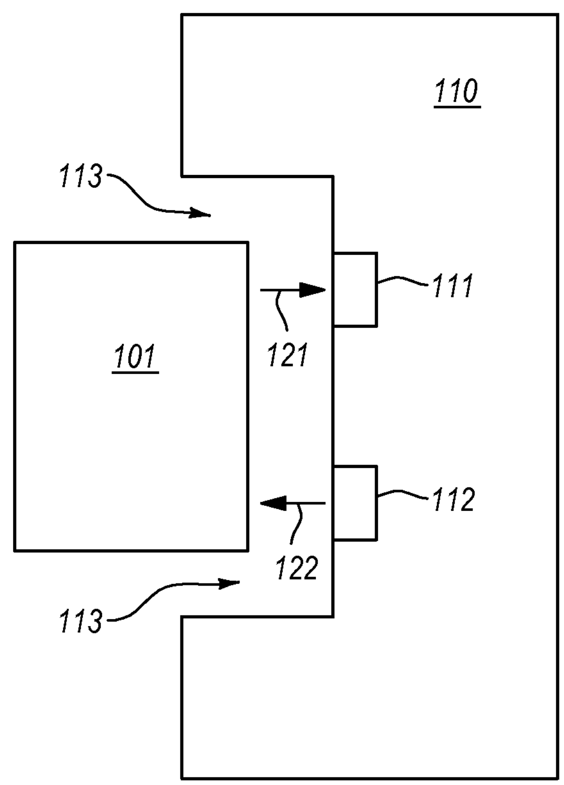
FIG. 1 abstractly illustrates a system that includes an image generation device that interfaces with an accessory that projects an interactive image sourced from the image generation device.

FIG. 1 abstractly illustrates a system 100 that includes an image generation device 101 that interfaces with an image generation device accessory 110 (also simply referred to hereinafter as an "accessory"). The image generation device 101 may be any device that is capable of generating an image and which is responsive to user input. As examples only, the image generation device 101 may be a smartphone, a tablet device, a laptop. In some embodiments, the image generation device 101 is a mobile device although not required.

FIG. 1 is an abstract representation in order to emphasize that the principles described herein are not limited to any particular form factor for the image generation device 101 or the accessory 110. However, several more concrete examples will be described below with respect to FIGS. 2 through 4, 10 and 11.

A communication interface is provided between the image generation device 101 and the accessory 110. For instance, the accessory 110 includes input communication interface 111 that receives communications (as represented by arrow 121) from the image generation device 101, and an output communication interface 112 that provides communications (as represented by arrow 122) to the image generation device 101. The communication interfaces 111 and 112 may be wholly or partially implemented through a bi-directional communication interface though not required. Examples of communication interfaces include wireless interfaces, such as provided by 802.xx wireless protocols, or by close proximity wireless interface such as BLUETOOTH®. Examples of wired communication interface include USB and HDMI. However, the principles described herein are not limited to these interfaces, nor are they limited to whether or not such interfaces now exist, or whether they are developed in the future.

Optionally, the accessory 110 includes a mechanical interface 113 into which the image generation device 101 may be docked. For instance, such docking might establish one or more communication interfaces between the image generation device 101 and the accessory 110. Several more concrete examples of accessories will now be described with respect to FIGS. 2 through 4.

Figure 2:
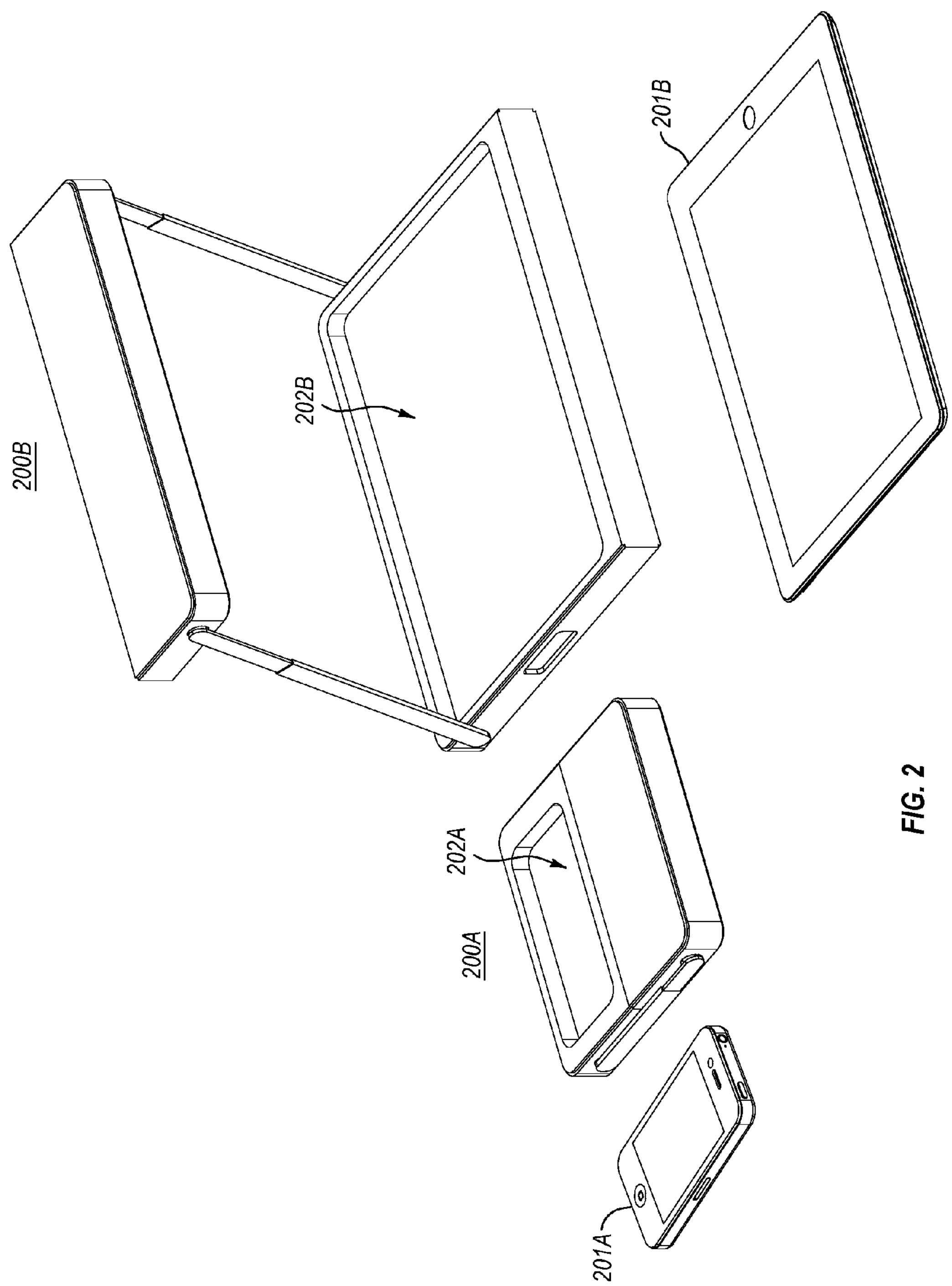
FIG. 2 illustrates a perspective view of several example accessories that represent examples of the accessory of FIG. 1.
Figure 3:
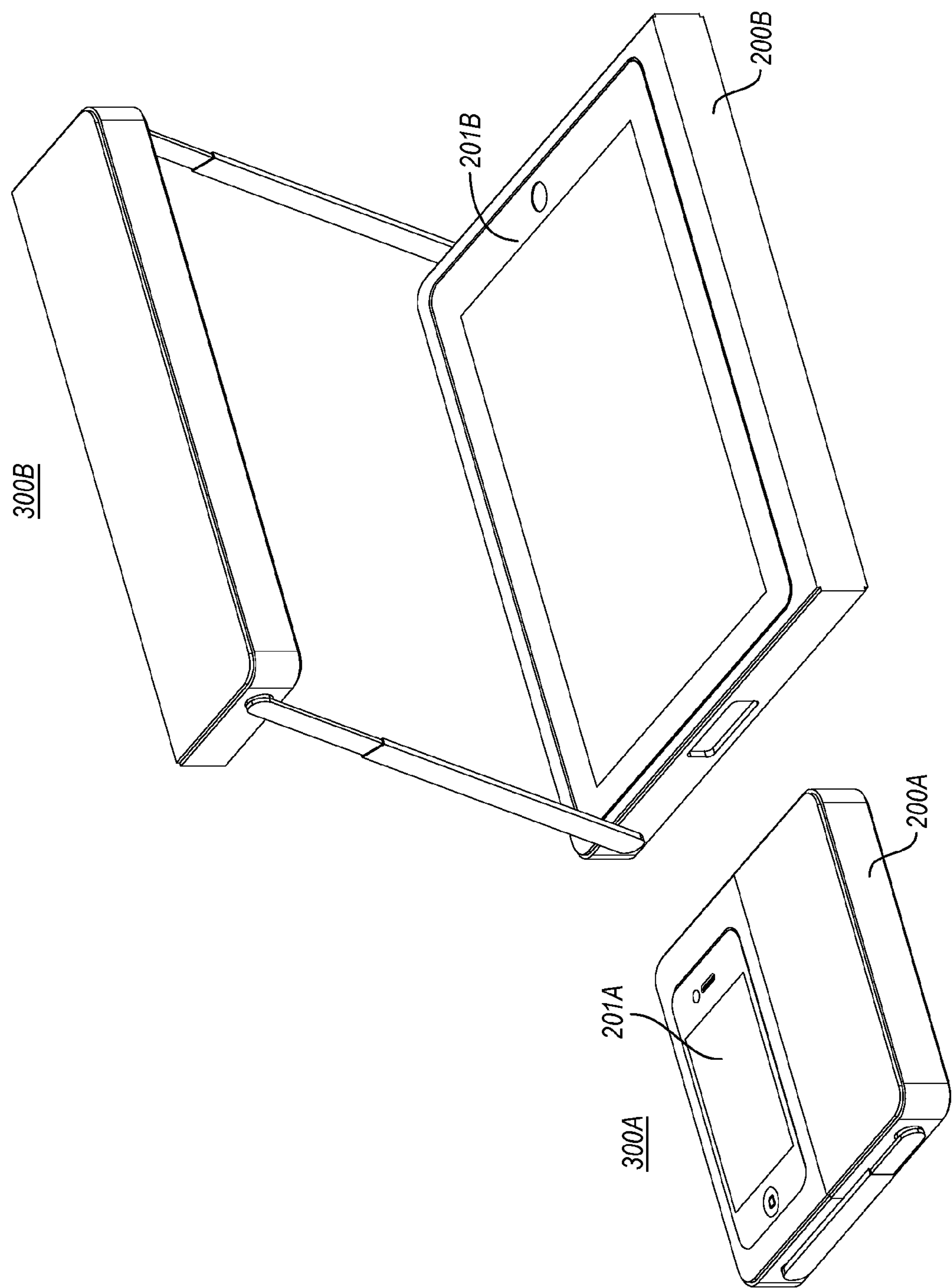
FIG. 3 illustrates a back perspective view of the assemblies of FIG. 2 with appropriate image generation devices docked, or wirelessly connected therein.
Figure 4:
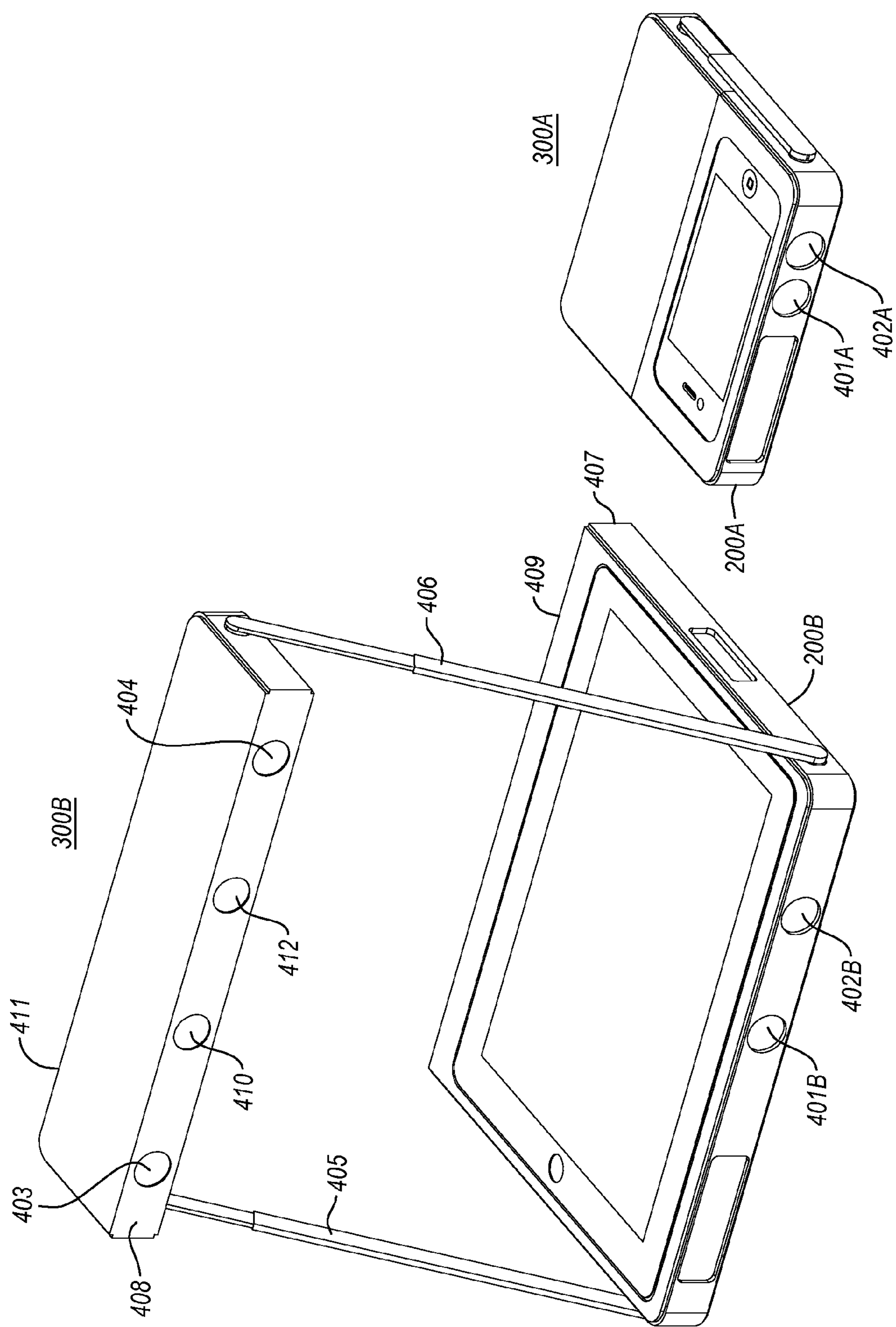
FIG. 4 illustrates a front perspective view of the assemblies of FIG. 2 with appropriate image generation devices docked therein.

FIG. 2 illustrates a perspective view of an accessory 200A that represents an example of the accessory 110 of FIG. 1, and which includes a port 202A into which an image generation device 201A may be positioned. In this case, the image generation device 201A is a smartphone. FIG. 3 illustrates a back perspective view of the assembly 300A, which is the combination of the image generation device 201A installed within the port 202A of the accessory 200A. FIG. 4 illustrates a front perspective view of the assembly 300A.

FIG. 2 also illustrates a perspective view of an accessory 200B that represents an example of the accessory 110 of FIG. 1, and which includes a port 202B into which an image generation device 201B may be positioned. In this case, the image generation device 201B is a tablet device. FIG. 3 illustrates a back perspective view of the assembly 300B, which is the combination of the image generation device 201B installed within the port 202B of the accessory 200B. FIG. 4 illustrates a front perspective view of the assembly 300B. In FIG. 2, though the image generation devices 201A and 201B are illustrated as being distinct components as compared to the respective accessories 200A and 200B. However, this need not be the case. The functionality described with respect to the image generation device and the associated projection accessory may be integrated into a single device.

Figure 5:
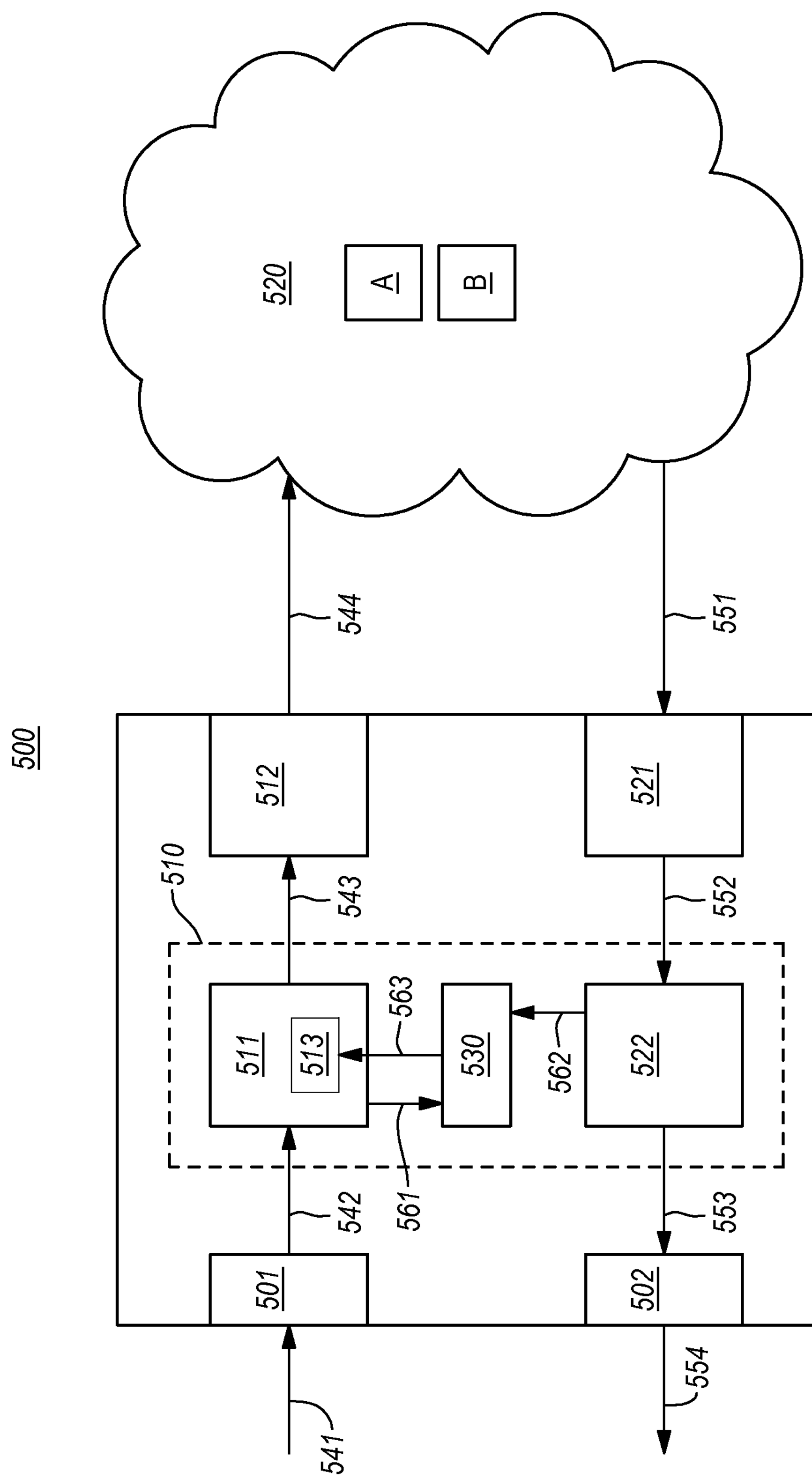
FIG. 5 abstractly illustrates an image generation device accessory, which represents an example of the accessory of FIG. 1.

FIG. 5 abstractly illustrates an image generation device accessory 500, which represents an example of the accessory 110 of FIG. 1. For instance, the accessory 500 includes an input interface 501 for receiving (as represented by arrow 541) an input image from an image generation device (not shown in FIG. 5) when the image generation device is interacting with the accessory. For instance, if the accessory 500 were the accessory 110 of FIG. 1, the input interface 501 would be the input communication interface 111 of FIG. 1. In that case, the accessory 500 would receive an input image from the image generation device 101 over the input interface 501.

An image generation device accessory 500 also includes a processing module 510 that includes a post-processing module 511 that receives the input image as represented by arrow 542. The post-processing module 511 performs processing of the input image to form a derived (or "post-processed") image, which it then provides (as represented by arrow 543) to a projector system 512. Examples of processing that may be performed by the post-processing module 511 includes the insertion of one or more control visualizations into the image, the performance of distortion correction on the input image, or perhaps the performance of color compensation of the input image to form the derived image. More detail regarding how this color compensation may be performed will be described further below with respect to FIG. 9. Another example includes blacking out a portion of the projection such that there is no projection on input devices or objects (such as a human hand or arm) placed within the scope of the projection. This will be described further hereinbelow.

The projector system 512 projects (as represented by arrow 544) at least the derived image of the input image onto a surface 220. In this description and in the claims, projecting "at least the derived image" means that either 1) the input image itself is projected in the case of there being no post-processing module 511 or in the case of the post-processing module not performing any processing on the input image, or 2) a processed version of the input image is projected in the case of the post-processing module 511 performing processing of the input image.

Figure 10:
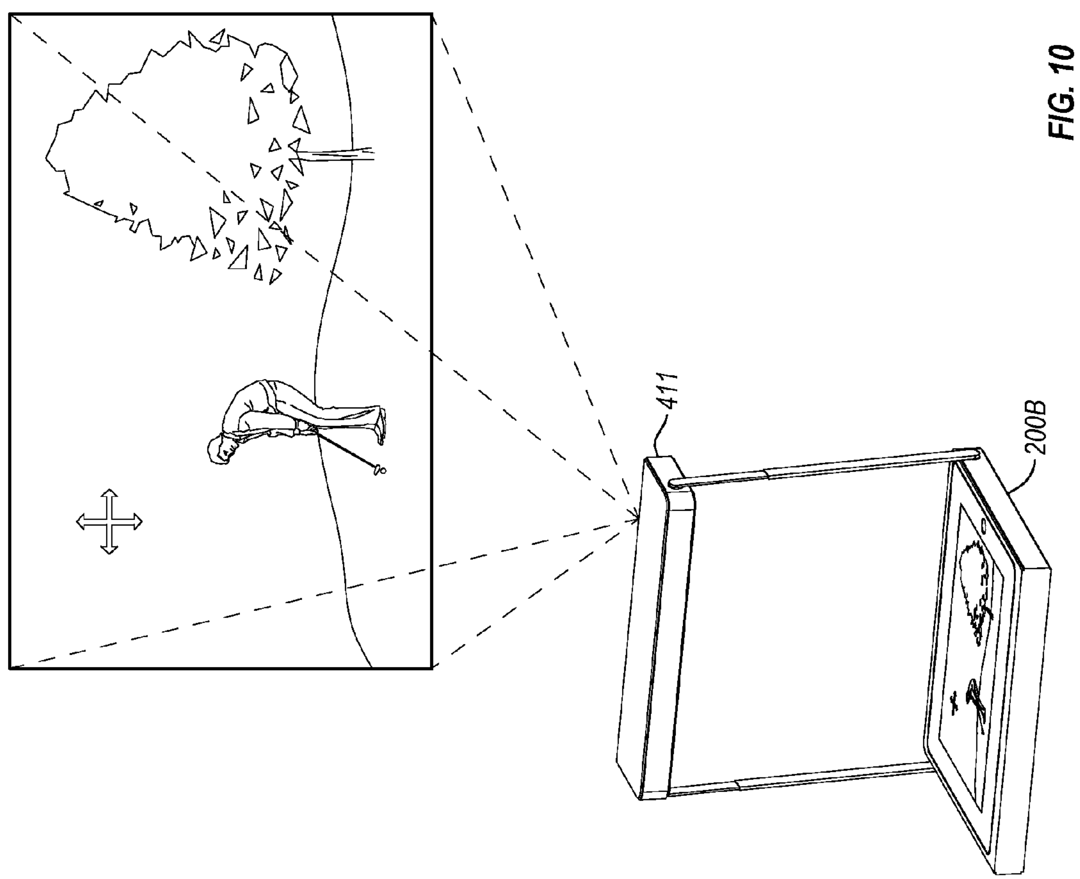
FIG. 10 illustrates an embodiment in which an elevated portion of an accessory of FIGS. 2 through 4 is angled so that its projector projects the image on a vertical wall.
Figure 11:
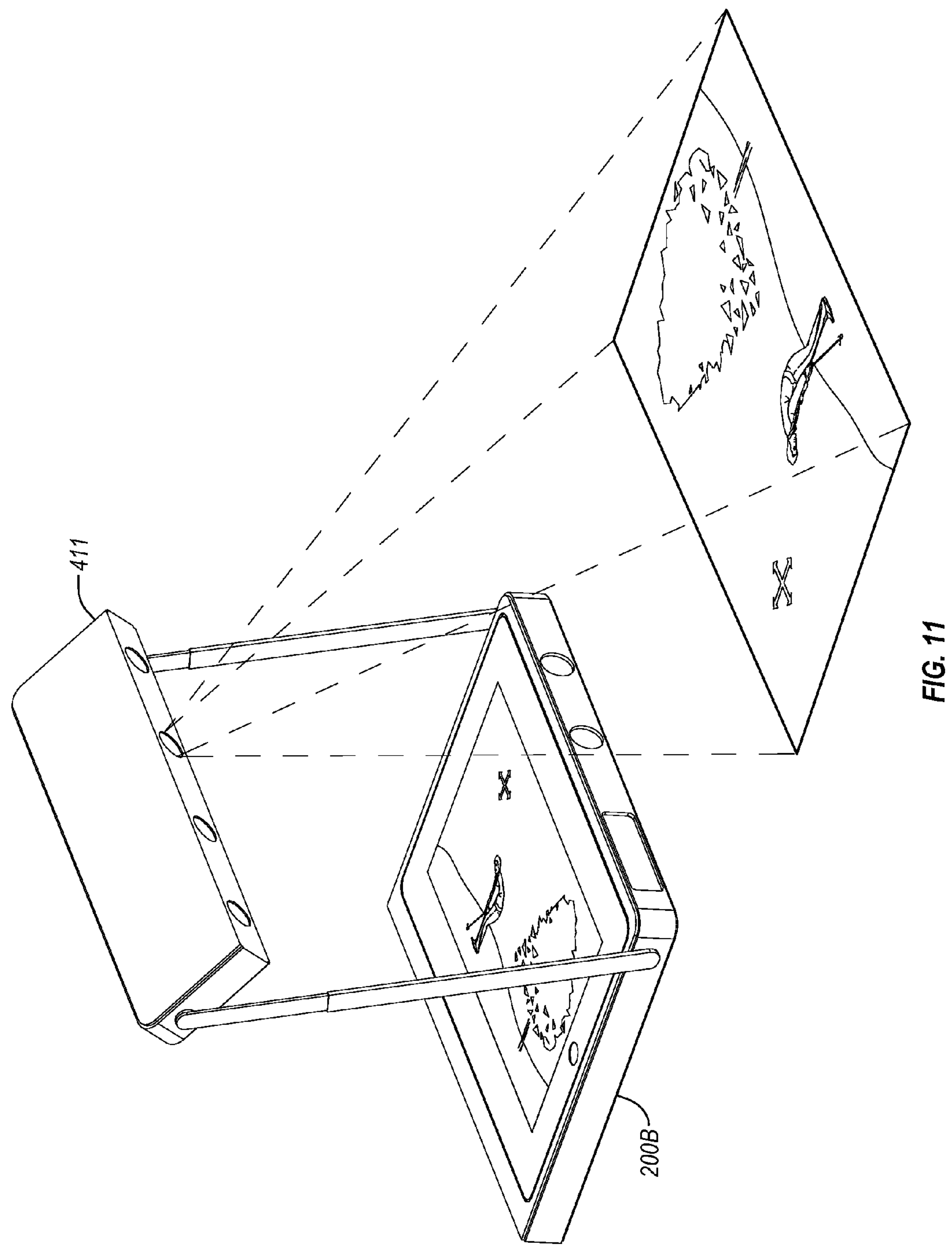

For instance, FIG. 10 illustrates an embodiment in which an elevated portion 411 of the accessory 200B is angled so that its projector projects the image on a vertical wall. In contrast, FIG. 11 illustrates an embodiment in which the elevated portion 411 of the accessory 200B is angled downwards so as to project the image on the same surface that the accessory 200B sits on.

In the case of projecting on the same surface on which the accessory sits, there might be some post-processing of the input image to compensate for expected distortions, such as keystoning, when projecting at an acute angle onto a surface. Furthermore, although not required, the projector might include some lensing to avoid blurring at the top and bottom portions of the projected image. Alternatively, a laser projector might be used to avoid such blurring when projecting on a non-perpendicular surface.

Returning to FIG. 5, the projected image 520 includes control visualizations A and B, although the principles described herein are not limited to instances in which controls are visualized in the image itself. For instance, gestures may be recognized as representing a control instruction, without there being a corresponding visualized control.

The control visualizations may perhaps both be generated within the original input image. Alternatively, one or both of the control visualizations may perhaps be generated by the post-processing module 511 (hereinafter called "inserted control visualization"). For instance, the inserted control visualizations 511 might include a keyboard, or perhaps controls for the projection system 512. The inserted control visualizations 511 might also be mapped to control visualizations 511 provided in the original input image such that activation of the inserted control visualization 511 results in a corresponding activation of the original inserted control visualization 511 within the original image.

The accessory 500 also includes a camera system 521 for capturing data (as represented by arrow 551) representing user interaction with the projected image. A detection module 522 receives the captured data (as represented by arrow 552) and detects an image input event using the captured data from the camera system 521. If the control visualization that the user interfaced with was an inserted control visualization that has no corresponding control visualization in the input image, then the processing module 510 determines how to process the interaction. For instance, if the control was for the projector itself, appropriate control signals may be sent to the projection system 512 to control the project in the manner designated by the user interaction. Alternatively, if the control was for the accessory 500, the processing module 510 may adjust settings of the accessory 500.

If the control visualization that the user interfaced with was one of the control visualization in the original input image, or does not correspond to a control that the processing module 510 itself handles, the detection module 522 sends (as represented by arrow 553) the input event to the output communication interface 502 for communication (as represented by arrow 554) to the image generation device.

Figure 6:
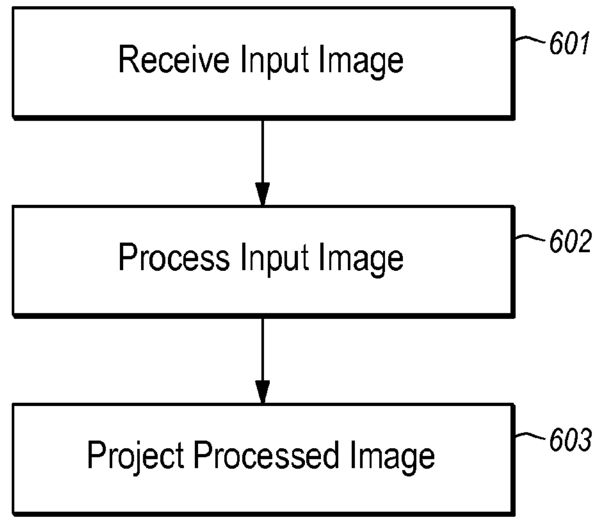
FIG. 6 illustrates a flowchart of a method for an image generation device accessory facilitating interaction with a projected image along the path involved with projecting the image.

FIG. 6 illustrates a flowchart of a method 600 for an image generation device accessory facilitating interaction with a projected image. As an example only, the method 600 may be performed by the accessory 500 of FIG. 5. Accordingly, the method 600 will now be described with frequent reference to FIG. 5. In particular, the method 600 is performed as the input image and derived image flow along the path represented by arrows 541 through 544.

In particular, the accessory receives an input image from the image generation device (act 601). This is represented by arrow 541 leading into input communication interface 501 in FIG. 5. The input image is then optionally processed to form a derived image (act 602). This is represented by the post-processing module 511 receiving the input image (as represented by arrow 542), whereupon the post-processing module 511 processes the input image. The at least derived image is then projected onto a surface (act 603). For instance, the projection system 512 receives the input image or the derived image as represented by arrow 542, and projects the image as represented by the arrow 544.

Figure 7:
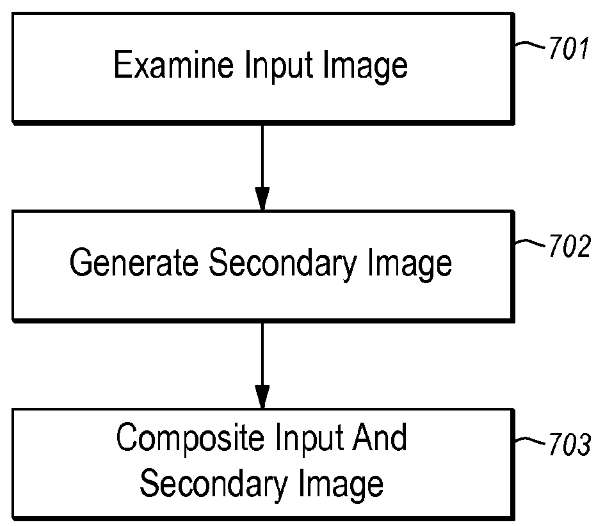
FIG. 7 illustrates a flowchart of a method for processing the input image to form a derived image.

FIG. 7 illustrates a flowchart of a method 700 for processing the input image to form the derived image. As such, the method 700 represents an example of how act 603 of FIG. 6 might be performed. Upon examining the input image (act 701), a secondary image is generated (act 702). The secondary image is then composited with the input image to form the derived image (act 703).

Figure 8:
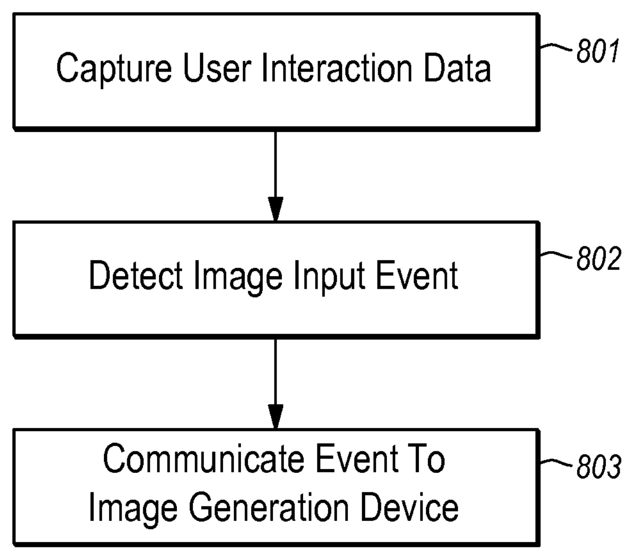
FIG. 8 illustrates a flowchart of a method for an image generation device accessory facilitating interaction with a projected image along the path involved with passing input event information back to the image generation device.

FIG. 8 illustrates a flowchart of a method 800 for an image generation device accessory facilitating interaction with a projected image. As an example only, the method 800 may be performed by the accessory 500 of FIG. 5. Accordingly, the method 800 will now be described with frequent reference to FIG. 5. In particular, the method 800 is performed as information flows along the path represented by arrows 551 through 554.

The camera system captures data representing user interface with the projected image (act 801). For instance, the camera system might capture such data periodically, such as perhaps at 60 Hz or 120 Hz. Several examples of such a camera system will now be described. A first camera system will be referred to as a "light plane" camera system. A second camera system will be referred to as a "structured light" camera system. Each of these camera systems not only capture light, but also emit light so that resulting reflected light may be captured by one or more cameras. In these examples, the light emitted from the camera system is not in the visible spectrum, although that is not a strict requirement. For instance, the emitted light may be infrared light.

The light plane camera system is particularly useful in an embodiment in which the accessory sits on the same surface on which the image is projected. The camera system of the accessory might emit an infrared light plane approximately parallel to (and in close proximity to) the surface on which the accessory rests. For instance, referring to FIG. 4, the accessory 200A includes two ports 401A and 402A, which each might emit an infrared light plane. Likewise, the accessory 200B includes two ports 401B and 402B, each emitting an infrared light plane. Each plane might be generated from a single infrared laser which passes through a diffraction gradient to produce a cone-shaped plane that is approximately parallel to the surface on which the accessory 200A or 200B sits. Assuming that surface is relatively flat, the infrared planes will also be in close proximity to the surface on which the image is projected. Infrared light is outside of the visible spectrum, and thus the user will not typically observe the emissions from ports 401A and 402A of accessory 200A, or the emissions from ports 401B and 402B of accessory 200B.

An infrared camera system may be mounted in an elevated portion of the accessory to capture reflections of the infrared light when the user inserts an object into the plane of the infrared light. For instance, referring to FIG. 4, there may be two infrared cameras 403 and 404 mounted on the elevated portion 411. The use of two infrared ports 401B and 402B that emit infrared light and two infrared cameras 403 and 404 is a protection in case there is some blockage of one the emissions and/or corresponding reflections.

Referring to FIG. 4, the accessory 200B is illustrated in extended position that is suitable for projection. There may also be a contracted position suitable for transport of the accessory 200B. For instance, arms 405 and 406 might pivot about the base portion 407 and the elevated portion 411, allowing the elevated portion 411 to have its flat surface 408 abut the flat bottom surface 409 of the base portion 407. For instance, accessory 200A is shown in its contracted position, but accessory 200A might also be positioned in an extended position with an elevated portion that includes all of the features of the elevated portion 411 of the accessory 200B. The arms 405 and 406 might be telescoping to allow the elevated portion 411 to be further raised. This might be particularly helpful in the case of accessory 200A, which has smaller dimensions than the accessory 200B.

In the example of the light plane camera system, when an object is positioned to touch the surface in the area of the protected image, the object will also break the infrared plane. One or both of the infrared cameras 403 or 404 will then detect a bright infrared light reflecting from the object at the position in which the object breaks the infrared plane. As an example, the object might be a pen, a stylus, a finger, a marker, or any other object.

In the structured light camera system, infrared light is again emitted. In the example of FIG. 4, infrared light is emitted from the emitter 412. However, the infrared light is structured such that relative depth information can be inferred from the reflections of that structured infrared light. For instance, in FIG. 4, the structured light reflections may be received by infrared cameras 403 and 404.

The structured light might, for example, be some predetermined pattern (such as a repeating grid pattern) that essentially allows for discrete sampling of depth information along the full extent of the combined scope of the infrared emitter 412 and the infrared cameras 403 and 404. As an example only, the infrared emitter 412 might emit an array of dots. The infrared cameras 403 and 404 will receive reflections of those dots, wherein the width of the dot at each sample point correlates to depth information at each sample point.

The infrared image may be fed by the camera system 521 to the detection module 522. In the structured light camera system example, that image includes the reflected structured light that implies depth information. The detection module 522 may detect the depth information, and be able to distinguish objects placed within the field of camera view. It may thus recognize the three-dimensional form of a hand and fingers placed within the field of view.

This information may be used for any number of purposes. One purpose is to help the post-processing module 511 black out those areas of the input image that corresponds to the objected placed in the field of view. For instance, when a user places a hand or arm into the projected image, the projected image will very soon be blacked out in the portions that project on the hand or arm. The response will be relatively fast such that it seems to the user like he/she is casting a shadow within the projection whereas in reality, the projector simply is not emitting in that area. The user then has the further benefit of not being distracted by images emitting onto his hands and arm.

Another use of this depth information is to allow complex input to be provided to the system. For instance, in three-dimensional space, the hand might provide three positional degrees of freedom, and 3 rotational degrees of freedom, providing potentially up to 6 orthogonal controls per hand. Multiple hands might enter into the camera detection area, thereby allowing a single user to use both hands to obtain even more degrees of freedom in inputting information. Multiple users may provide input into the camera detection area at any given time.

The detection mechanism 522 may further detect gestures corresponding to movement of the object within the field of camera view. Such gestures might involve defined movement of the arm, hands, and fingers of even multiple users. As an example, the detection mechanism 522 might even be able to recognize sign language as an alternative input mechanism to the system.

Another use of the depth information might be to further improve the reliability of touch sensing in the case in which both the structured light camera system and the light plane camera system are in use. For instance, suppose the depth information from the structured light camera system suggests that there is a human hand in the field of view, but that this human hand is not close to contacting the projection surface. Now suppose a touch event is detected via the light plane camera system. The detection system might invalidate the touch event as incidental contact. For instance, perhaps the sleeve, or side of the hand, incidentally contacted the projected surface in a manner not to suggest intentional contact. The detection system could avoid that turning into an actual change in state. The confidence level associated with a particular same event for each camera system may be fed into a Kalman filtering module to arrive at an overall confident level associated with the particular event.

Other types of camera systems 521 include depth camera and 3-D camera. The captured data representing user interaction with the projected image may be provided (as represented by arrow 552) to the detection module 522, which applies semantic meaning to the raw data provided by the camera system. Specifically, the detection module 522 detects an image input event using the captured data from the camera system (act 802). For instance, the detection module 522 might detect a touch event corresponding to particular coordinates. As an example only, this touch event may be expressed using the HID protocol.

In the light plane camera system example, the detection module 522 might receive the infrared image captured by the infrared camera and determine where the point of maximum infrared light is. The detection module 522 might also take as input the configuration of the elevated component 411 (such as whether it is pointed down, or forward, and whether the telescoping arms are extended and to what extent). From this information, and with the detection module 522 understanding the position and orientation of each infrared camera, the detection module 522 can apply trigonometric mathematics to determine what portion of the image was contacted.

In making this calculation, the detection module 522 might perform some auto-calibration by projecting a calibration image, and asking the user to tap on certain points. This auto-calibration information may be used also to apply some calibration adjustment into the calculation of which portion of the projected image the user intends to contact.

The detection module 522 might also apply auto-calibration after the initial calibration process, when the user is actually interacting with a projected image. For instance, if the detection module 522 notices that the user seems to select a certain position, and then almost always later correct by selecting another position slightly offset in a consistent way, the detection module 522 might infer that this consistent offset represent an unintended offset within the initial selection. Thus, the detection module 522 might auto-calibrate so as to reduce the unintended offset.

Returning to FIG. 8, the accessory then communicates the detected input event to the image generation device (act 803). For instance, the output communication interface 502 may have established a transmit socket connection to the image generation device. The image generation device itself has a corresponding receive socket connection. If the operating system itself is not capable of producing such a receive socket connection, an application may construct the socket connection, and pass it to the operating system.

The input event may take the form of floating point value representations of the detecting contact coordinates, as well as a time stamp when the contact was detected. The image generation device receives this input event via the receive socket level connection. If the receive socket level connection is managed by the operating system, then the event may be fed directly into the portion of the operating system that handles touch events, which will treat the externally generated touch event in the same manner as would a touch event directly to the touch display of the image generation device. If the receive socket level connection is managed by the application, the application may pass the input event into that same portion of the operating system that handles touch events.

As previously mentioned, the post-processing module 511 may perform color compensation of the input image prior to projecting the image. As the accessory may be placed on all types of surfaces including non-white surfaces, non-uniformly colored surfaces, and the like, the characteristics of the surface will impact the colorization of the viewed image. The color compensation component 530 accounts for this by comparing the color as viewed to the color as intended, and performing appropriate adjustments. This adjustment may be performed continuously. Thus, the system may respond dynamically to any changes in the surface characteristics. For instance, if the accessory is moved slightly during play, the nature of the surface may be altered.

Figure 9:
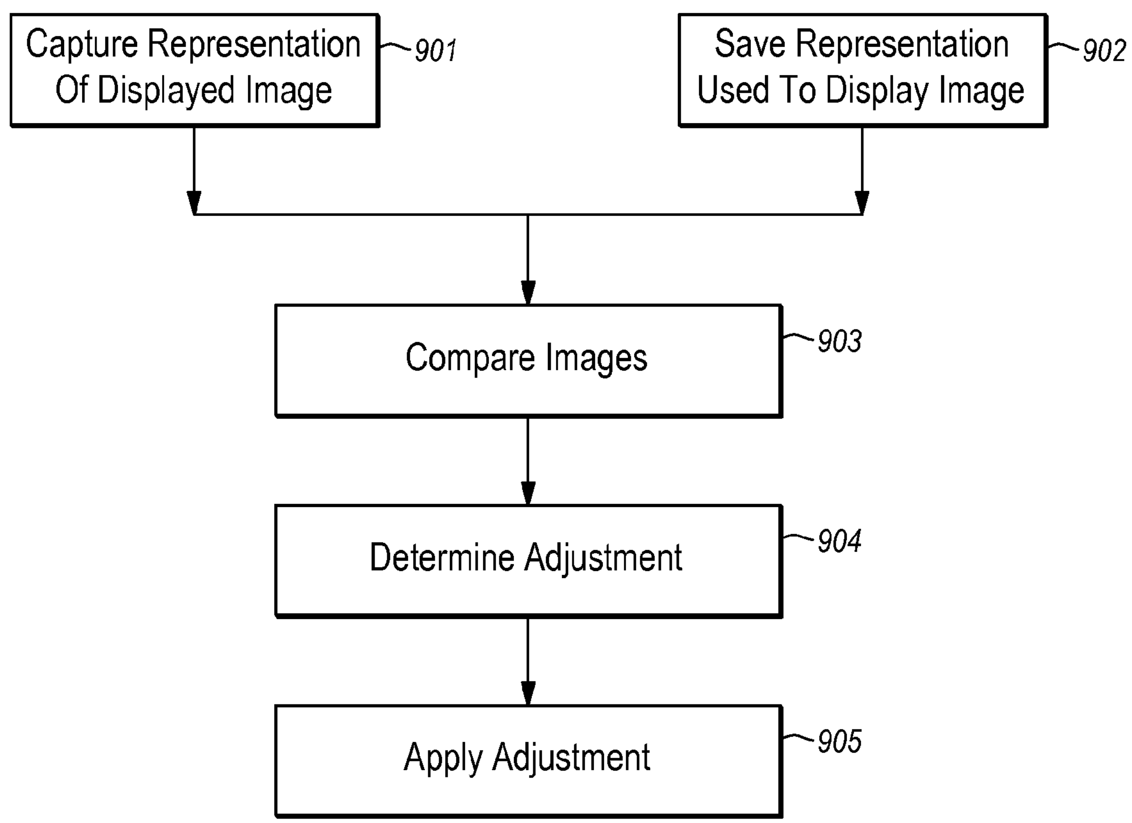
FIG. 9 illustrates a flowchart of a method for performing color compensation for a displayed dynamic image.

FIG. 9 illustrates a flowchart of a method 900 for performing color compensation for a displayed dynamic image. The method 900 may be performed by the color compensation component 530 of FIG. 5 in order to compensate for color displayed by the accessory on a surface. However, the method 900 may be performed in any other environment in which there is a displayed image that may have a colorization that differs from an intended color. For instance, the method 900 may be performed in a movie theater and would respond to discolorations in the projection surface (e.g., due to splashed coffee or flaking paint, or the like). The method 900 may also be performed on a television display. The dynamic image might be a moving image, a television image, a displayed image, a game image, or any other image. The method 900 may be continuously performed in order to respond to dynamic changes or perhaps may just be periodically performed, or perhaps is just performed once.

A digital representation (also called hereinafter a "first digital image representation") is captured of the actual displayed image as displayed (act 901). For instance, in FIG. 4, there might be a visible range camera 410 that actual takes a picture of the projected dynamic image.

Furthermore, the digital image representation of the version of the dynamic image that was used to generate the displayed image is saved (act 902). This will be referred to as the "second digital image representation". For instance, suppose that a dynamic image is composed of the display of frame A, followed by frame B, followed by frame C. If a picture is to be taken of frame A as displayed, when the frame A first arrives for post-processing (at the post-processing module 511), the frame A may be saved. This is represented by the first arrow 561 being provided to the color compensation unit 530. After post-processing, the processed version A' of that frame is then projected. The visible range camera takes a picture of that projected frame A', and that digital representation is also provided to the color compensation unit 530 as represented by arrow 562. By this point, the post-processing module might be working on processing subsequent frame B or C.

The color compensation unit 530 then compares the captured first digital image representation with the saved second digital representation (act 903). Based on this, a determination of what color compensation adjustment could have been made to the second digital representation in order to form a projected image that is more closely colorized to match the input image (act 904). The post-processing unit is then instructed to make the adjustment to the current frame (e.g., frame B and C, and perhaps subsequent frames also). For instance, color compensation unit 530 instructs (as represented by the second arrow 563) the filter 513 of the post-processing module 511 to apply the adjustment.

Accordingly, the principles described herein describe embodiments in which a dynamic interactive image may be projected on a surface by an accessory to the device that actually generates the image, thereby allowing interaction with the projected image, and thereby causing interactivity with the image generation device. As an example, the accessory may be an accessory to a smartphone or tablet, or any other image generation device.

The accessory 500 has been described as including a processing module 510. This processing module 510 may be implemented using hardware, software, or a combination thereof. In one embodiment, the processing module 510 is implemented by a computing system, such as the computing system 1200 described before with respect to FIG. 12. Accordingly, some basic features of a computing system will now be described with respect to FIG. 12.

Figure 12:
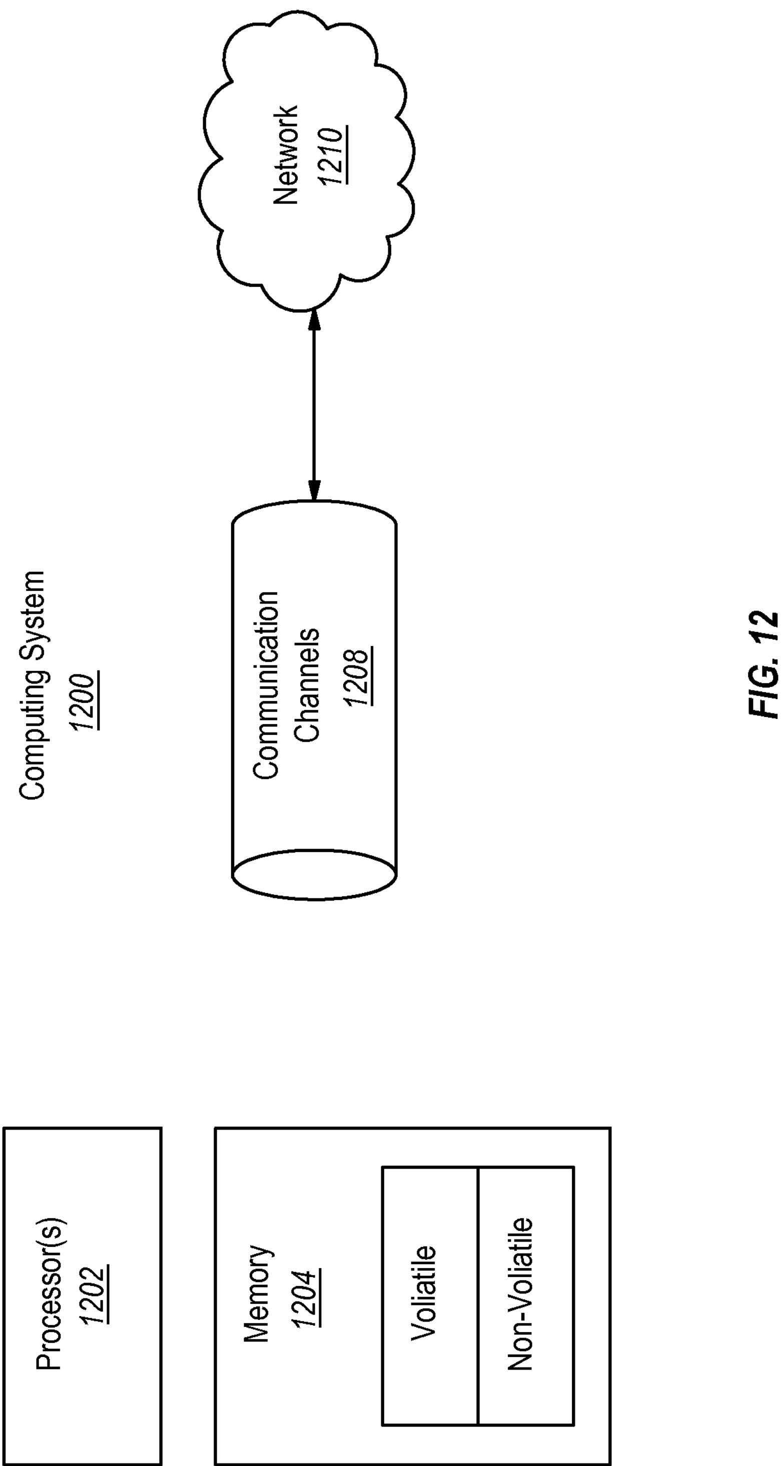
FIG. 12 illustrates a computing system that may be used to implement aspects described herein.

As illustrated in FIG. 12, in its most basic configuration, the computing system 1200 typically includes at least one processing unit 1202 and memory 1204. The memory 1204 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 1204 of the computing system 1200. The computing system 1200 may also contain communication channels 1208 that allow the computing system 1200 to communicate with other message processors over, for example, network 1210.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for facilitating interaction with a projected image, the method comprising:

receiving an image input from an image generation device;

projecting an image comprising at least a derived image of the input image onto a surface on which the image generation device sits;

capturing interaction data representing user interaction with the image that is projected on the surface by scanning a three-dimensional space over the surface, the interaction data corresponding to reflected light from a physical object and including:

information about a three-dimensional shape of the physical object;

information regarding a position, orientation or arrangement of the physical object over the surface and the image; and movement of the physical object relative to the surface and the image;

detecting an image-interactive input event using the interaction data; and communicating an interactive input corresponding to the image-interactive input event to the image generation device.

2. The method in accordance with claim 1, further comprising:

processing the interaction data or the interactive input to provide a derived image.

3. The method in accordance with claim 2, wherein processing the interaction data or the interactive input image to provide the derived image comprises:

generating a secondary image; and compositing the secondary image with the interactive input.

4. The method in accordance with claim 2, wherein processing the interaction data or the interactive input to provide the derived image comprises:

performing color compensation of the interactive input to provide the derived image.

5. The method in accordance with claim 4, wherein performing color compensation comprises:

capturing an image of the projected image;

comparing the image of the projected image with a version of the interactive input that corresponds to the projected image; and determining an adjustment to the version of the interactive input that would have resulted in a projected image that is closer to the version of the image input that corresponds to the projected image.

6. The method in accordance with claim 5, wherein determining the adjustment uses as input an amount of prior adjustment to the interactive input in response to a prior color compensation of the interactive input.

7. The method in accordance with claim 5, wherein the version of the interactive input that corresponds to the projected image is a prior frame of the interactive input as compared to a current frame of the interactive input to which color compensation is being applied.

8. The method in accordance with claim 2, wherein processing the interaction data or the interactive input to form the derived image comprises:

performing distortion correction on the interactive input.

9. The method in accordance with claim 2, wherein processing the interaction data or the interactive input to form the derived image comprises:

inserting one or more control visualizations into the projected image.

10. The method in accordance with claim 1, wherein receiving the image input comprises receiving the image input from an image generation device comprising a smartphone.

11. The method in accordance with claim 1, wherein receiving the image input comprises receiving the image input from an image generation device comprising a tablet computing device.

12. The method in accordance with claim 1, wherein capturing the interaction data comprises capturing the interaction data with a structured light system.

13. The method of claim 1, wherein capturing interaction data comprises capturing interaction data including information about a three-dimensional shape of a hand, information regarding a position, orientation or arrangement of the hand over the surface and the image and movement of the hand relative to the surface and the image.

14. The method of claim 1, wherein capturing interaction data comprises capturing interaction data including information about a three-dimensional shape of a physical object extending from a location outside of a periphery of the image and placed over the surface and the image.

15. The method of claim 1, wherein capturing interaction data comprises capturing interaction data further including information about contact between the physical object and the surface or information about contact between the physical object and another physical object placed on the surface.

16. An image generation device accessory, comprising:

an input interface for receiving an image input from an image generation device when the image generation device is interacting with the image generation device accessory;

a projector for projecting a projected image comprising at least a derived image of the image input onto a surface by which the image generation device is supported;

a camera system for scanning a three-dimensional space over the surface upon which the projected image is displayed and for capturing interaction data representing user interaction with the projected image on the surface, the interaction data corresponding to reflected light from a physical object and including:

information about a three-dimensional shape of the physical object;

information regarding a position, orientation or arrangement of the physical object over the surface and the image; and movement of the physical object relative to the surface and the image;

a detection mechanism for detecting an image input event using captured data from the camera system; and an output interface for communicating the image input event to the image generation device.

17. The image generation device accessory in accordance with claim 16, further comprising:

a mechanical interface with which the input interface may dock.

18. The image generation device of claim 16, wherein the camera system captures interaction data corresponding to a physical object that comprises a hand.

19. The image generation device of claim 16, wherein the camera system captures interaction data corresponding to a physical object that extends from a location outside of a periphery of the image and placed over the surface and the image.

20. The image generation device of claim 16, wherein the camera system also captures interaction data comprising information about contact between the physical object and the surface or information about contact between the physical object and another physical object placed on the surface.

* * * * *